3,199,966
METHOD AND APPARATUS FOR TREATING SHEET GLASS
Thomas B. O'Connell, Toledo, Richard R. Snow, Perrysburg, and Norman K. Gladieux, Toledo, Ohio, assignors to Libbey-Owens-Ford Glass Company, Toledo, Ohio, a corporation of Ohio
Filed July 31, 1961, Ser. No. 128,066
8 Claims. (Cl. 65—26)

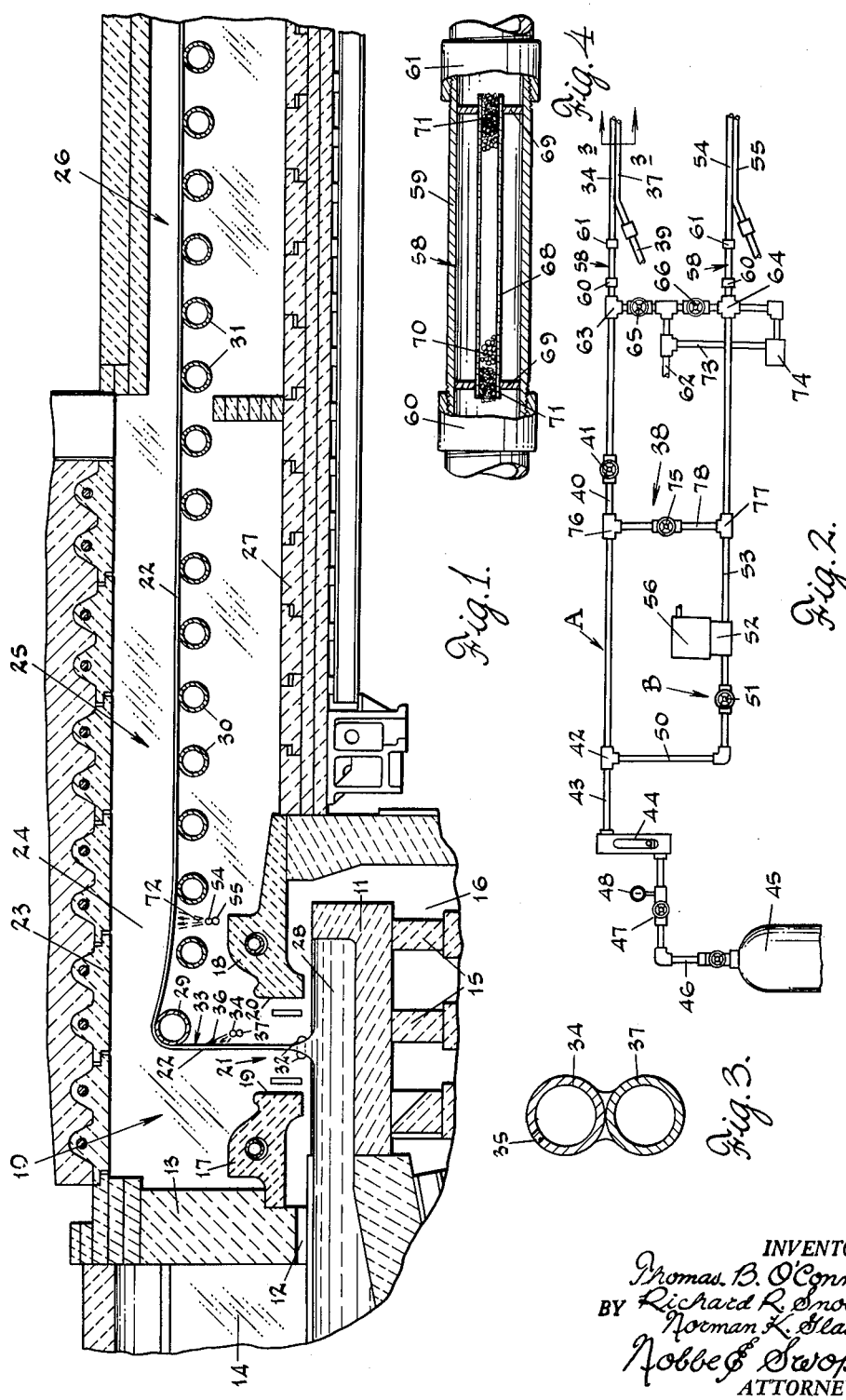

The present invention relates broadly to the production of sheet glass and more particularly to an improved method of and apparatus for treating the surface or surfaces of a continuous ribbon of glass as it is drawn from a bath of molten glass.

This invention is of particular utility in the treatment of flat glass generally referred to as "sheet" or "window" glass which is produced with natural fire-finished surfaces as distinguished from "plate" glass, the surfaces of which are mechanically ground and polished.

While the invention is not limited to use in connection with any particular process for forming continuous sheet glass, it has been illustrated in the drawings and will be described herein with reference to the so-called Colburn process in which a sheet or ribbon of glass is continuously drawn upwardly from a bath of molten glass and then deflected over a bending roll into a substantially horizontal plane and carried forwardly over a series of supporting rolls into and through an annealing leer. It can, however, also be effectively employed in processes in which the ribbon of glass is drawn vertically from a bath of molten glass through a drawing chamber and annealing leer.

One of the objections attendant with such processes has been the fact that the surfaces of the newly formed glass ribbon are subject to a number of defects or surface imperfections that have heretofore come to be considered more or less characteristic of flat drawn glass. Among such defects are surface conditions particularly noticeable on the surface or surfaces of the glass ribbon and referred to in the art as "sheen," "shrend," "spalls" and "asbestos" or "metal." In certain instances, these defects have been attributed to the condition of the drawing and/or supporting rolls which contact the newly formed glass ribbon and have been found to vary during the length of time the rolls are in use. Thus, the existence of any imperfections in the peripheral surfaces of the rolls has led to the conclusion that, in one way or another, such imperfections tend to produce undesirable conditions in the surfaces of the glass ribbon.

A principal object of the present invention therefore is to provide a novel method of and apparatus for improving the surface quality of a continuous ribbon of glass by reducing surface defects which have heretofore resulted from contact of the newly formed ribbon with the drawing and/or supporting rolls.

Another object of the invention is to provide a method and apparatus for treating one or both surfaces of the glass ribbon by applying a special coating material to the peripheral surfaces of the drawing and/or supporting rolls and replenishing this coating at regular intervals.

A further object of the invention is to provide a method and apparatus in which the coating material is initially applied to the glass ribbon and then transferred therefrom onto the sheet contacting rolls.

A still further object of the invention is to provide such a method and apparatus in which the coating material is initially applied as a film to an area of a surface or surfaces of the glass ribbon and carried thereby onto the peripheral surfaces of the rolls, and in which the coating material is periodically replenished by coating subsequent surface areas of the ribbon as required.

Other objects and advantages of the invention will become more apparent during the course of the following description when read in connection with the accompanying drawings.

In the drawings, wherein like numerals are employed to designate like parts throughout the same:

FIG. 1 is a longitudinal, vertical section through the drawing chamber and associated parts of a flat glass drawing machine of the Colburn type;

FIG. 2 is a diagrammatic view of a filming apparatus;

FIG. 3 is a cross-section detail view of the apparatus of FIG. 2, as taken on line 3—3 of FIG. 2; and FIG. 4 is a longitudinal cross-section of another portion of the apparatus.

As pointed out above, the invention is not restricted to use in connection with any particular process of drawing continuous sheet glass and the illustration and description herein of the so-called Colburn process is to be taken as an example of only one process with which the invention may be used.

Referring now to the drawings and particularly to FIG. 1, the numeral 10 designates the working end or drawing chamber of a glass tank furnace, which includes a working receptacle or draw pot 11 that is supplied with properly conditioned molten glass through a channel 12 beneath the end wall 13 of a cooling chamber 14. The draw pot 11 is mounted on stools 15 in a pot chamber 16. The lower area of the drawing or forming chamber 10 is substantially closed off from the draw pot 11 by conventional front and rear liptiles 17 and 18 respectively, which also act to define, between their opposed faces 19 and 20, the actual zone 21 through which the glass sheet 22 is drawn upwardly. The chamber 10 is defined by the wall 13, roof 23 and side walls, one of which is indicated at 24. The roof 23 and side walls 24 continue from the chamber 10 to suitably enclose a flattening chamber 25 and an adjoining annealing leer 26. The bottoms of the flattening chamber 25 and annealing leer 26 are closed by a floor 27.

The ribbon of glass 22 is continuously drawn upwardly from a pool of molten glass 28 in the working receptacle or pot 11. In the Colburn type of machine, the glass ribbon 22 is drawn initially in a vertical plane and is then bent at right angles over an internally cooled bending roll 29 so that it can be then carried horizontally on drawing rolls 30 in the flattening chamber 25 and through the annealing leer 26 on rolls 31, before being finally cut into individual sheets at the exit end of the leer. Also, in drawing the glass ribbon from the molten pool 28, a meniscus or enlarged base portion is created adjacent the surface of the pool 28 and the final thickness is not determined until the ribbon has been drawn upwardly for some distance toward the bending roll 29. The width of the ribbon is generally maintained by means of conventionally employed knurl rolls 32.

During the continuous drawing operation, it is of course apparent that one surface of the ribbon 22, indicated by the numeral 33, will be in contact with the surface of the bending roll 29 and move in surface contact with the peripheries of the rolls 30 in the flattening chamber 25 and rolls 31 in the annealing leer 26. It is during this formative period of the glass ribbon that the surface 33 thereof is particularly susceptible to conditions within the drawing chamber and/or annealing leer that tend to impair its quality.

In accordance with the present invention, it has been found that when the peripheries of the bending and drawing or supporting rolls are supplied with a coating of sodium sulphate, such coating will serve as a parting agent or lubricant over which a surface of the glass ribbon can move without being marred by the surface of the contacting rolls. Briefly stated, the layer of coating material is applied to a surface of the glass ribbon in the form of a gas which is directed toward the surface and which is adapted to form a film thereon as the result of chemical reaction with the glass. The film is then transferred by the ribbon to the drawing and/or supporting rolls to form a lubricating layer thereon. For this purpose, there is shown in FIG. 1 a tubular supply member which comprises a pipe 34 located beneath the bending roll 29 and in spaced relation to the adjacent surface 33 of the glass ribbon. As indicated in FIGS. 1 and 3, the pipe 34 is provided with a plurality of holes or orifices 35 that are equally spaced therealong and adapted to direct the gas toward the glass surface as indicated by the arrows 36. The supply pipe 34 has a pipe 37 fixedly secured to the lower surface thereof for carrying a cooling medium such as water. As viewed in FIG. 2, the pipe 34 forms a part of a supply system, generally designated by the numeral 38 with one end of the pipe 37 being connected by a conduit 39 to a source of coolant (not shown). The coolant pipe 37 also serves as a bending roll cooler as conventionally employed in the Colburn type of sheet glass drawing machine.

For reasons to be hereinafter more fully disclosed, the supply system 38 is adapted to be automatically or manually operated and to this end includes a pipe 40 connected to the pipe 34 at a hand valve 41; pipe 40 being coupled through a T-fitting 42 to a pipe 43. The pipe 43 is connected to a flowscope 44. This flow indicator conventionally has a small visible float which rises during the flow of a fluid and/or gas as from the supply cylinder 45 through piping 46 by way of the pressure regulator valve 47 having an indicator dial 48.

Unlike the rolls 30 and 31 which are power driven, the bending roll 29 is normally an idly rotating member moving with and about which the glass ribbon 22 is deflected from the vertical plane in which it is formed to a horizontal plane in which it is drawn and carried forwardly through the flattening chamber 25 and the leer 26. However smooth the periphery of the bending roll may appear to close inspection, it has been common practice to "spin" or mechanically drive this roll when first installed so that, by such relatively rapid rotation relative to the undersurface of the glass ribbon, a "lapping" operation was effected whereby the glass surface served to smooth out the roll surface. This naturally results in a length of glass of unsuitable quality.

Referring again to FIG. 1, the pipe 34 is positioned between the meniscus of the pool of molten glass and the bending roll 29 and transversely between the side walls 24 and with regularly spaced orifices 35, as indicated by the several arrows 36, directing a supply of gas against the surface 33 of the glass ribbon 22 and between the marginal edges thereof. A film is thus formed on the glass surface through the chemical reaction between the component elements of the glass and of the gas. The resulting film is carried upwardly onto the peripheral surface of the bending roll. Preferably, this filming operation is carried out during the above-mentioned spinning of the bending roll so that the rapid rotation of the roll serves to smooth the surface thereof and to apply a coating of the film to the glass surface. Heretofore it has been assumed that a gas, such as sulphur dioxide ($SO_2$) can be employed, and that an early film of sodium sulfite ($Na_2SO_3$) is apparently formed on the glass surface which will then combine with oxygen to finalize into a film of sodium sulfate ($Na_2SO_4$). However, when sulphur dioxide is introduced into an atmosphere of sufficient oxygen content, it is now believed, as a result of extensive development work, that the sulphur dioxide gas combines with the oxygen of the atmosphere to produce sulphur trioxide ($SO_3$) which then reacts with the sodium oxide ($Na_2O$) of the glass surface to form the resulting film of sodium sulfate ($Na_2SO_4$). The formation of a protective film of this character can thus consist in combining sulphur dioxide gas with the oxygen in the furnace atmosphere to form sulphur trioxide gas ($SO_3$) which then reacts with the available sodium oxide in the glass surface to form sodium sulfate. The $SO_2$ gas accordingly is used in the treatment merely as a source of $SO_3$ gas.

In carrying out the method of this invention, the primary use of sulphur trioxide is greatly preferred; however, this gas is known to be difficult to handle and its physical characteristics make it as difficult to dispense in a production unit. Sulphur trioxide gas can be formed by the union of sulphur dioxide gas and oxygen at elevated temperatures as at about 800° F. This reaction, however, is sluggish and requires catalysis to produce satisfactory yields. A suitable catalyst for this purpose can be employed in the supply system, above described, and even the pipe through which the gas is introduced into the furnace chamber could serve to some extent for this purpose because at some point along the pipe a temperature zone would exist which would promote the reaction. The advantages in converting as much of the $SO_2$ as possible to $SO_3$ are that the reaction between the gas and the glass would be faster and more efficient; that the volume of $SO_2$ could be reduced and thus reduce the possibility of the excess $SO_2$ being carried around the furnace chambers to etch the hotter glass and corrode the metal work of the furnace and, importantly, that the increase in the velocity of the gas resulting from the addition of air would allow the gas ($SO_3$) to be directed in a more restricted area of the glass ribbon.

In practice, it is now proposed to convert sulphur dioxide to sulphur trioxide by mixing the $SO_2$ gas with measured quantities of either air or oxygen. This resulting oxidation can be assisted by the catalytic action of the metal dispensing pipe or by passing the gas through an efficient catalyst to increase the yield of sulphur trioxide. The sulphur dioxide ($SO_2$), as converted into sulphur trioxide ($SO_3$), reacts with the alkali ($Na_2O$) at the surface of the glass ribbon to form sodium sulfate ($Na_2SO_4$). This results in a soft, white film on the undersurface of the glass. As the particular filmed area of the glass passes over the bending or drawing rolls, the sodium sulfate acts as a protective film between the undersurface thereof and the peripheral surfaces of the rolls. At the same time, and as above mentioned, it serves not only as a parting agent to prevent sticking of the glass at higher temperatures but also to prevent the rolls from abrading the glass surfaces. Here it should be emphasized that two novel features of the invention reside in the fact that, in the preferred modes of application, the $SO_3$ gas is not applied continuously to the undersurface of a glass ribbon as it moves continuously over the source of the gas. The film-covered areas of the glass ribobn will thus have a "running" length determined by the period of time the control system is in operation and intervening unfilmed areas spaced apart by the periods of time that the control system is not operating. The film-covered areas will transfer a considerable amount of the film of sodium sulfate to the surfaces of the bending roll and drawing or supporting rolls while said areas are in contact therewith. This will provide a protective surface of sodium sulfate on the rolls for the unfilmed areas and the inoperative cycles of the control system will depend upon the rate of removal of the protective coating by the unfilmed glass surface moving in contact therewith. Adjustment of the control system can also be carried out when it has been determined that the rolls, through wear or like conditions, require replenishing of the protective coating in more closely spaced periods of the applying operation.

It is therefore contemplated that sulphur dioxide will basically be employed for the purposes herein disclosed and that, in one way or another, the formation of a film of sodium sulfate will be the result of the introduction of sulphur trioxide gas into the atmosphere through which the glass ribbon is passing. The resulting film, however, is, as herein described, not continuously applied.

The film is discontinuous, occuring only at spaced intervals on the undersurface of the glass ribbon and being removed therefrom by contact transfer onto the surfaces of the roll.

As practiced in the drawing or forming chamber 10, the $SO_3$ gas is directed from supply pipe 34 toward the surface 33 of the upwardly moving glass ribbon while the temperature thereof is approximately 1250° F. At this temperature, it is believed that a satisfactory film of sodium sulfate will be applied. However, in view of the fact that it has been found advantageous to spin the roll simultaneously with the filming operation, it is not unfavorable to carry out the filming when the temperature of the glass exceeds 1250° F. and is at substantially 1350° F. Ordinarily the film and glass reaction at the higher temperature produces an etched surface which could cover an area from two to four feet in the running length of the glass ribbon. Since the glass surface resulting from the usual roll spinning operation is rendered unsuitable for ultimate use, the fact that the area of possibility etched surface and the area against which the roll was spun will substantially coincide to reduce the actual length of glass which will have unsatisfactory optical quality.

One of the prime reasons for filming the bending roll is to provide a peripheral surface thereon which has been found to reduce, if not entirely eliminate, the defective "sheen" condition. This defect is often caused by roughness or porosity of the roll and is determined by surface imperfections generally described as resembling the surface of an orange. However, by periodically replenishing the coated roll surface by application of the film forming gas to the one surface of the glass ribbon the sheen condition has been greatly remedied. Ordinarily, the length of filming operation has been found to be approximately one minute or for a sufficient length of time for a filmed area of from between two to four feet to be formed. Also the intervals between the filming operations can be varied depending on the roll condition and the rate at which the coating material is removed therefrom. Accordingly, the supply of gas to the pipe 34 through the piping 40 and 43 from the pressure regulator valve 47 and cylinder 45 is controlled by the hand valve 41 which is operated when the required filming is to be effectively employed. This piping arrangement can thus be described as the manual side A of the control system 38.

As viewed in FIG. 2, the system 38 also includes an automatic side B which has been used to advantage in practicing the method of this invention in connection with the rolls 30 of the flattening chamber 25 and even the first rolls 31 of the annealing chamber 26. For this purpose, at the T-fitting 42, the pipe 43 is connected to a pipe 50 which through a hand valve 51, a solenoid actuated valve 52 and communicating conduit 53 is connected to a gas supply pipe 54. Pipe 54 is, as in the case of the supply pipe 34, equipped with a coolant pipe 55. During an automatically phased cycle of operation, the actual control of gas flow to the pipe 54 is through the solenoid valve 52 and by an adjustable timing device 56 adapted to open the valve 52 for predetermined periods of time or "on-off" cycles that are spaced apart by the adjusted setting of the timing device.

As aforementioned, the conversion of sulphur dioxide ($SO_2$) into sulphur trioxide ($SO_3$) can be readily achieved by passing a mixture of $SO_2$ gas and air or oxygen through a suitable catalyst, and at a temperature of substantially 800° F. For this purpose, a catalyzing device 58 is provided as shown in the diagram of FIG. 2 and in detail in FIG. 4. The device 58 includes a short length of stainless steel pipe or tube 59 that is connected into each of the pipes 34 and 54 by means of pipe couplings 60 and 61. Adjacent the couplings 60, air or oxygen is introduced into the respective pipes from a source of supply through pipe 62 by way of fittings 63 and 64; supply pipe 62 being equipped with hand valves 65 and 66 to manually control the pressure delivered to the pipe 34 or pipe 54 as the case may be. The air or oxygen thus introduced into the respective supply pipes for sulphur dioxide ($SO_2$) gas physically combines therewith and, in flowing through the catalyzing chamber 58, chemically combines to produce sulphur trioxide ($SO_3$) gas which flows into the supply pipe 34 or 54. Within tube 59 of the device 58, a quartz tube providing a chamber 68, is supported by stainless steel disks 69. The chamber 68 is filled with a suitable catalyst material 70 such as platinized silica gel, which is contained therein by end plugs 71 of a porous material such as glass fibers. This type of catalyst, by way of example, can be prepared by absorbing the silica gel with platinum chloride ($H_2PtCl_6 6H_2O$) to obtain a 0.1% platinum content, drying the material, and then reducing the platinum to its metallic form in a hydrogen atmosphere at 1000° F. Accordingly, the combined flow of air or oxygen with sulphur dioxide gas through the chamber 68 will result in a converting reaction such as $SO_2 + \frac{1}{2}O_2 = SO_3$.

The location of catalyzing chamber 58 in either of supply pipes 34 or 54 is preferably in an area of the furnace chamber wherein the atmospheric temperature is substantially 800° F. The $SO_2$ from the cylinder 45 and passing to either of the supply pipes will thus be directed with the air or oxygen through the platinized silica gel in chamber 68 at an optimum temperature for the conversion phase thereof and flow from the orifices of the respective pipes in the desired form of sulphur trioxide gas ($SO_3$).

Referring again to FIG. 1, the pipe 54 is located transversely between the side walls 24 and provided with reguarly spaced orifices, which will direct the gas, as indicated by the arrows 72, against the undersurface 33 of the glass ribbon 22 and between the marginal edges thereof.

It has been found that the gas supply pipe 54, and coolant pipe 55, can be advantageously located, as indicated, between the first and second machine or table rolls 30 in the flattening chamber 25. While such a position for the pipes 54 and 55 is indicated in FIG. 1, this is not intended to be restrictive to the spirit of the invention since under certain conditions of operation, the pipes can be located to equally good advantage as between the third and fourth and even the fourth and fifth supporting rolls 30. As well, the pipe 54 is supported in sufficiently close proximity to said rolls so that they will form with the glass ribbon moving thereover a substantially closed chamber into which the gas will be supplied. This more or less positively insures that the resulting film will be confined to the exposed area of undersurface of the glass ribbon.

As previously mentioned, the susceptibility of the semi-plastic glass surface to imperfections in the surfaces of the rolls oftentimes results in defect conditions generally termed "shrend," "spalls" and "asbestos" or "metal." In one way or another, these defects are caused by localized cold spots in the roll surface, by smudging of the glass surface, flaking of the glass and other abrasions and surface intrusions. As the glass ribbon 22 is drawn from the bending roll 29, the temperature range is usually below 1200° F. and may be reduced initially in this area to around 1100° F. whereas as the ribbon moves toward and into the annealing leer 26 the temperature will gradually decrease and a hard surface will fully develop. It is therefore additionally advantageous to apply a gas in regularly spaced areas of the ribbons undersurface which film is carried onto the roll surface as the ribbon moves in contact therewith. Accordingly, the worn surface of the roll, oftentimes somewhat roughed due to accumulations of dirt or other foreign particles, and likewise by adhered or minutely projecting particles of its own material, will be favorably covered to afford an entirely smooth peripheral surface. This, to a material extent, appears to afford a lubricant surface over which the glass surface is carried and particularly prevents the glass from sticking to the rolls at higher temperatures and additionally prevents the rolls from abrading the glass. It has also been determined that the filmed areas on the glass ribbon will carry the coating to surfaces or rolls even in the "hot" end of the annealing leer with the amounts of film deposited being, of course, gradually lessened.

As herein disclosed, the filming apparatus will function during the "on" phase of the "on-off" cycles of the solenoid valve 52 as controlled by the timing device 56. These cycles may range from one minute, or more, "on" and sixty minutes "off" to one minute "on" to fifteen or less minutes "off". The "off" phase of the cycles appears to depend greatly upon the wearing effect of the drawing rolls 30 and supporting rolls 31 from the time they are installed in the flattening chamber and annealing leer until such time as they can be replaced or the drawing machine is shut down, and consequently these ranges of cyclic operation can be appreciably lengthened or shortened to suit the actual working operations.

Accordingly, with the pressured flow of $SO_2$ gas adjusted by the regulator valve 47, opening of the solenoid valve 52 by the timing device 56 will be reflected in rising of the indicator float in the flowscope 44 and the gas will be carried by the conduits, 43, 50 and 53 to the catalyzing device 58. Also, during operation of the automatic side B of the system 38 as controlled by the timing device 56, air or oxygen is admitted to the fitting 64 through a pipe 73 connecting to supply pipe 62 by way of solenoid valve 74. Valve 74 is electrically controlled by the timing device 56 to the end that when the device 56 becomes active, solenoid valves 52 and 74 will simultaneously permit the flow of $SO_2$ gas and air or oxygen so as to physically combine at the associated catalyzing device 58. The chemical combination resulting in $SO_3$ gas will thus flow to the supply pipe 54 which in actual operation is cooled by the cooling fluid flowing through the pipe 55 from a source not shown.

In the event the surface quality of the glass ribbon varies from acceptable optical quality by the appearance of defects, such as "abrasions" or "impressions," and it becomes desirable to make alterations in the cycles of operation, control of the filming apparatus can be obtained manually through a hand valve 75 between the manual side A and automatic side B upon closure of the valve 51 in the said automatic side B. For this purpose, a T-fitting 76 is interposed in the pipe 40 between the hand valve 41 and the fitting 42 and a similar fitting 77 is located in the conduit 53. The fittings 76 and 77 are interjoined by a pipe 78 controlled by the valve 75.

Through observation of the pressure of gas flow, which by way of example may be adjusted to one c.f.h. (cubic feet per hour) and determination of the length of time the valve is open, the actual length and position of filmed areas can be approximated and inspected at the cutting-off or cold end of the leer. Likewise, the length of unfilmed glass areas can be ascertained and the influence of the film coated rolls determined by the decrease or increase of surface defects. During the automatic cycling, the timing device 56 can thus be adjusted to repeat the filming cycles as frequently as required when it has been established that the protective coating has been transferred from the rolls onto the undersurface of the glass ribbon and the varied conditions of the roll surfaces have again become instrumental in the production of glass having unsatisfactory surface qualities.

It is thus believed apparent that the control system 38 can be employed, when desired and opening of the hand valves 41 and 65 of the manual side A, to supply $SO_2$ gas and air or oxygen to the catalyzing device 58 with resulting flow of $SO_3$ gas to the pipe 34 and to the surface 33 of the glass ribbon 22 beneath the bending roll 29 and with valves 51 and 66, in the automatic side B, closed. On the other hand, with valve 41 closed and valve 51 opens, the automatic side B of the system will permit, during the "on" phase of the timing device 56, the flow of $SO_2$ gas through the solenoid valve 52 and pipes 43, 50 and 53 to the associated catalyzing device 58. As above mentioned, when the timer 56 activates solenoid valve 52 it simultaneously activates solenoid valve 74 whereby air or oxygen from supply pipe 62 through pipe 73 will be directed to fitting 64 in advance of the catalyzing device 58. Also, with the hand valve 41 closed and the normally open valve 51 in the closed position, the valves 66 and 75 can be opened to manually control the "on-off" cycles to determine the lengths of filmed areas on the undersurface of the glass ribbon and also the length of unfilmed areas occurring therebetween. Likewise, with the system operating under the automatic control of the timing device 56 and with the hand valve 75 in the closed position, the hand valves 41 and 65 can be employed to permit the flow of $SO_3$ gas from the associated device 58 to provide a filmed area of suitable length on the surface of the ribbon 22 as it as drawn upwardly toward the bending roll 29.

As above mentioned, the "on" phase of the filming cycle and the "off" phase can be predetermined as a result of trials and can vary within time ranges of from one to six minutes "on" and from fifteen to sixty minutes "off." As well, the gas flow can be adjusted to any desirable pressure such as from one to three or more c.f.h. Each of these time or gas volume factors can be readily adjusted to suit the rate at which the glass ribbon is drawn, the temperature thereof as it contacts the bending roll and/or the machine and leer rolls, the condition of the rolls surfaces and the rate at which such surfaces become worn or covered with foreign particles.

It has thus been found that it is not entirely necessary to continuously form a film of sodium sulfate on the surface of a glass ribbon after it is drawn to improve or maintain a surface, free from certain defects and with satusfactory optical quality. This stems from the fact that the sulphur trioxide gas produces a film which is transferred to the rolls as a film of sodium sulfate with the glass ribbon serving as the carrier. The filmed area, thus depleted to some extent of its coating, is nevertheless protected during its continuing movement while the unfilmed undersurface of the glass ribbon will be protected while moving in contact with the said rolls by reason of the protective coatings thereon. As a result, the periodic replenishment of the protective roll coating can be determined and a glass sheet of satisfactory quality received at the cold end of the leer. Additionally, as pointed out above, filming of particularly the bending roll affords a means for obtaining an improved glass surface in which defects are materially reduced if not entirely eliminated. This is made possible by, initially if desired as well as periodically, forming a protective coating of sodium sulfate on the bending roll through the application of the sulphur trioxide gas and concurrently spinning said roll.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

We claim:

1. In apparatus for improving the quality of sheet glass, means for drawing a continuous ribbon of glass from a bath of molten glass, at least one rotatable roll positioned to engage the glass ribbon while it is in a highly heated softened condition, and means for directing a gas toward a surface of the glass ribbon to form a film thereon, said gas directing means including a tubular member extending transversely of the glass ribbon and provided with a series of spaced openings, a source of gas connected to said tubular member, and means for controlling the flow of gas through said tubular member, said film being transferred from the glass ribbon to the roll in response to rotation thereof whereby a protective coating is formed on said roll.

2. In apparatus for improving the quality of sheet glass, means for drawing a continuous ribbon of glass from a bath of molten glass, at least one rotatable roll positioned to engage the glass ribbon while it is in a highly heated softened condition, and means for directing a gas toward a surface of the ribbon to form a film thereon, said gas directing means including a tubular member extending transversely of the glass ribbon and provided with a series of spaced openings, means for supplying sulphur dioxide gas to said tubular member, and means for adding oxygen to said gas to convert it to sulphur trioxide gas before it is discharged through the openings in said tubular member, said film being transferred from the glass ribbon to the roll in response to rotation thereof whereby a protective coating is formed on said roll.

3. In apparatus for improving the quality of sheet glass as defined in claim 2, in which the means for adding oxygen to the sulphur dioxide gas comprises a source of oxygen and a catalyst reaction chamber mounted in said tubular member and through which the sulphur dioxide gas and oxygen pass.

4. In apparatus for improving the quality of sheet glass as defined is claim 2, in which the means for adding oxygen to the sulphur dioxide gas comprises a source of oxygen and a catalyst reaction chamber mounted in said tubular member and through which the sulphur dioxide gas and oxygen pass, and means for controlling the supply of sulphur dioxide gas including a valve, and timing means connected with said valve for automatically opening and closing the valve at predetermined intervals.

5. In apparatus for improving the quality of sheet glass as defined in claim 2, including means for cooling the tubular member.

6. A method of improving the quality of sheet glass wherein a continuous ribbon of glass is drawn upwardly from a bath of molten glass and moved over and in contact with a supporting roll while in a highly heated softened condition, comprising the steps of directing sulphur trioxide gas toward a surface of the glass ribbon in advance of said supporting roll, said sulphur trioxide gas reacting with the surface of the glass ribbon to form a transferable film of sodium sulphate thereon, and transferring said film from the ribbon to the supporting roll in response to the movement of said sheet over and in contact with said roll to thereby form a protective coating on said roll.

7. A method of improving the quality of sheet glass as claimed in claim 6, wherein oxygen is added to sulphur dioxide to form said sulphur trioxide gas prior to the directing of said gas toward said ribbon.

8. A method of improving the quality of sheet glass as claimed in claim 6, including periodically directing said gas toward said glass ribbon to form said film on alternately spaced areas of said ribbon, and rotating said roll at a peripheral speed greater than the rate of movement of the glass ribbon thereover during the periods of application of said gas to transfer said film and form said protective coating.

References Cited by the Examiner

UNITED STATES PATENTS

| | | | |
|---|---|---|---|
| 2,336,785 | 12/43 | Guernsey | 65—26 |
| 2,596,694 | 5/52 | Kegg | 65—30 |
| 2,675,646 | 4/54 | Kiamer et al. | 65—60 X |
| 2,881,566 | 4/59 | Badger | 65—30 |

FOREIGN PATENTS 294,391    7/28    Great Britain.

DONALL H. SYLVESTER, *Primary Examiner.*